(12) United States Patent
Kyllönen et al.

(10) Patent No.: US 11,088,759 B2
(45) Date of Patent: Aug. 10, 2021

(54) EXTRACTING DATA TRAFFIC FROM AN OPTICAL COMMUNICATION FIBER

(71) Applicant: EXFO Oy, Oulu (FI)

(72) Inventors: Vesa Kyllönen, Oulu (FI); Sakari Yrttiaho, Oulu (FI); Daniel Gariepy, Québec (CA); Gang He, Québec (CA)

(73) Assignee: EXFO OY, Oulu (FI)

( * ) Notice: Subject to any disclaimer, the term of this patent is extended or adjusted under 35 U.S.C. 154(b) by 0 days.

(21) Appl. No.: 16/880,185

(22) Filed: May 21, 2020

(65) Prior Publication Data

US 2020/0374008 A1 Nov. 26, 2020

(30) Foreign Application Priority Data

May 24, 2019 (FI) ...................................... 20195430

(51) Int. Cl.
  *H04B 10/12* (2006.01)
  *H04B 10/25* (2013.01)
  *H04J 14/02* (2006.01)
(52) U.S. Cl.
  CPC .............. *H04B 10/25* (2013.01); *H04J 14/02* (2013.01)
(58) Field of Classification Search
  CPC .. H04B 10/25; G02B 6/2852; G02B 6/29385; G02B 6/4287
  See application file for complete search history.

(56) References Cited

U.S. PATENT DOCUMENTS

| 4,253,727 | A | | 3/1981 | Jeunhomme et al. |
| 5,555,086 | A | * | 9/1996 | vonBieren ......... G01D 5/35383 250/227.27 |
| 5,818,629 | A | * | 10/1998 | Kinoshita ........ H04B 10/07955 359/337.11 |
| 6,265,710 | B1 | * | 7/2001 | Walter ................. G02B 6/2852 250/227.11 |
| 7,660,503 | B2 | | 2/2010 | Makino et al. |

(Continued)

FOREIGN PATENT DOCUMENTS

| CN | 104506232 A | 4/2015 |
| EP | 0548053 A2 | 6/1991 |

(Continued)

OTHER PUBLICATIONS

Takui Uematsu, "Design of a Temporary Optical Coupler Using Fiber Bending for Traffic Monitoring", Dec. 2017, IEEE Photonics Journal, vol. 9, No. 6, All pages.*

(Continued)

*Primary Examiner* — Pranesh K Barua
(74) *Attorney, Agent, or Firm* — Buchanan Ingersoll & Rooney PC (57) ABSTRACT

There is provided a system and a method for extracting data traffic from an optical communication fiber by extracting a portion of the optical signal(s) propagating in the optical communication fiber, carrying the extracted signal over an optical fiber, amplifying the extracted optical signal and filtering the amplified signal to select one channel carrying data traffic. The optically-carried data traffic may then be input to an optical communication transceiver for converting the optically-carried data traffic into electrical data traffic, which carried data can be analyzed for data traffic monitoring applications.

18 Claims, 4 Drawing Sheets

(56) References Cited

U.S. PATENT DOCUMENTS

| | | | |
|---|---|---|---|
| 7,710,552 B2 | 5/2010 | He | |
| 7,719,667 B2 | 5/2010 | He et al. | |
| 8,976,344 B2 | 3/2015 | Liang et al. | |
| 8,995,805 B2 | 3/2015 | Meade | |
| 9,109,978 B2 | 8/2015 | Liang et al. | |
| 9,160,758 B2 | 10/2015 | Sohn et al. | |
| 9,400,228 B2 | 7/2016 | Niimi et al. | |
| 9,455,999 B2 | 9/2016 | Sohn et al. | |
| 9,534,982 B2 | 1/2017 | Frigo et al. | |
| 9,612,413 B2 | 4/2017 | Meade | |
| 9,797,807 B2 | 10/2017 | Frigo et al. | |
| 10,148,350 B2 | 12/2018 | Thollabandi et al. | |
| 10,168,247 B2 | 1/2019 | Frigo et al. | |
| 2002/0071164 A1* | 6/2002 | Lange | H04J 14/02 398/202 |
| 2004/0208437 A1* | 10/2004 | Pacheco | G02B 6/24 385/29 |
| 2005/0105916 A1* | 5/2005 | Lee | H04B 10/5165 398/182 |
| 2006/0045426 A1* | 3/2006 | Poole | G02B 6/2852 385/48 |
| 2006/0215975 A1* | 9/2006 | Kim | G01M 11/3172 385/123 |
| 2008/0192241 A1* | 8/2008 | He | G02B 6/2852 356/73.1 |
| 2008/0273876 A1* | 11/2008 | Lundquist | H04B 10/296 398/59 |
| 2009/0097849 A1 | 4/2009 | Childers et al. | |
| 2009/0175585 A1 | 7/2009 | Makino et al. | |
| 2010/0046944 A1 | 2/2010 | Wagener et al. | |
| 2010/0329604 A1* | 12/2010 | Kojima | G02B 6/2852 385/31 |
| 2011/0110673 A1* | 5/2011 | Elberbaum | H01H 9/0271 398/202 |
| 2011/0217004 A1* | 9/2011 | Niimi | G02B 6/4201 385/32 |
| 2013/0215417 A1 | 8/2013 | Diestelmans et al. | |
| 2013/0279848 A1 | 10/2013 | Meade | |
| 2014/0064723 A1* | 3/2014 | Adies | H04B 10/616 398/25 |
| 2014/0092380 A1* | 4/2014 | Chen | H04B 10/071 356/73.1 |
| 2014/0186030 A1 | 7/2014 | Winzer et al. | |
| 2014/0226151 A1* | 8/2014 | Bennett | G01M 11/3163 356/73.1 |
| 2014/0307251 A1 | 10/2014 | Liang et al. | |
| 2016/0366163 A1 | 12/2016 | Sohn et al. | |
| 2018/0198519 A1 | 7/2018 | Thollabandi et al. | |
| 2018/0302420 A1 | 10/2018 | Nakanelua et al. | |
| 2018/0324194 A1 | 11/2018 | Nakanelua et al. | |

FOREIGN PATENT DOCUMENTS

| | | |
|---|---|---|
| JP | 2014219286 A | 11/2014 |
| JP | 2015087122 A | 5/2015 |
| JP | 2015114421 A | 6/2015 |
| JP | 2015129898 A | 7/2015 |
| JP | 2015155998 A | 8/2015 |
| JP | 2015206840 A | 11/2015 |
| JP | 2017161821 A | 9/2017 |

OTHER PUBLICATIONS

Takui Uematsu, "Design of a Temporary Optical Coupler Using Fiber Bending for Traffic Monitoring", Dec. 2017, IEEE Photonics Journal, vol. 9, No. 6, All pages (Year: 2017).*
Finnish Search Report dated Dec. 2, 2019.
Exfo Electo-Optical Engineering Inc., Clip-on Coupling Device, FCD-10B Network Testing—Optical, 2008, Canada.
Fiber Optic Devices, Clip-On Coupler, FOD 5503, Mar. 17, 2010.
Paulina Gomez, How to Hack an Optical Fiber in Minutes . . . and How You Can Secure It, Nov. 17, 2016, Ciena.
Max Penfold, A Practical Instrument for Non-Intrusive Detection of Light on Singlemode Optical Fibres, Biccotest Limited, 1991, IEEE.
Exfo Inc., M5 Analyzer, Software-Based Mobile Network Analyzer, 2015, Canada.
Ciena, In the Lab: Hacking a Fiber Optic Line in Minutes, URL: https://youtu.be/X-hAtc-ku-Y, Mar. 28, 2017.

* cited by examiner

EXTRACTING DATA TRAFFIC FROM AN OPTICAL COMMUNICATION FIBER

TECHNICAL FIELD

The present description generally relates to a method and a system for extracting data traffic from an optical communication fiber, and more particularly without impacting the propagated optical signals.

BACKGROUND

Tapping data out of a communication link can be used by agencies such as police forces, intelligence services and government security agencies, for purposes of monitoring the nature or the substance of communications between target entities or target people for example. This can be made by tapping out a small portion of the communication signal propagating in the link in a way that is not easily detectable by the network operator. Although tapping data out of copper communication links is known in the art, tapping data out of optical fibers is more challenging because it would require to cut or disconnect the optical communication fiber in order to insert a tap coupler (a fiberoptic component known in the art of optical fibers and which allows to extract a small amount of light propagating in a link). Such procedure would not remain unnoticed because any ongoing communication would be interrupted during the insertion process.

It may be envisaged to use other light extraction methods such as bend couplers. An example of a bend coupler is described in U.S. Pat. No. 7,710,552. Bend couplers are used to curve a portion of the optical fiber enough for a portion of the propagating light to leak out of the optical fiber. Leaked light is detected by one or more photodetectors positioned in proximity with the curved portion. Such configuration can be used to detect the presence of a light signal in an optical fiber but cannot be used, for example, to extract data traffic in case of Wavelength Division Multiplexed (WDM) signals because once light is detected by the photodetector, it is no longer possible to demultiplex the WDM signals.

EXFO's FCD-10B Clip-On Coupling Device is a tapping device used to tap on an optical fiber to extract a portion of the propagating optical signal and couple the extracted portion into an optical fiber. This device is meant to be used for communicating over an optical fiber when the fiber end is not accessible and is designed to connect a fiber optic talk set to an existing unused fiber. The clip-on device introduces an insertion loss up to 6 dB, which would be likely to cause service interruption on a live fiber and, if not, would be very likely detected if used on a live optical communication fiber.

Another method for extracting light signals out of an optical fiber is proposed in U.S. Pat. No. 6,265,710, based on capturing Rayleigh scattering but the coupling efficiency of such method is expected to be extremely low.

There remains a need for a method and a system for extracting data traffic from an optical communication fiber without impacting the propagated optical signals in a detectable manner.

SUMMARY

In accordance with one aspect, there is provided a system and a method for extracting data traffic from a optical communication fiber by extracting a portion of the optical signal(s) propagating in the optical communication fiber, carrying the extracted signal over an optical fiber, amplifying the extracted optical signal and filtering the amplified signal to select one channel carrying data traffic. The optically-carried data traffic may then be input to an optical communication transceiver for converting the optically-carried data traffic into electrical data traffic, which carried data can be analyzed for data traffic monitoring applications.

Because the extracted optical signal is injected into an optical fiber at the site where light is tapped out of the optical communication fiber, it can be carried over a relatively long distance (>1 km) before being amplified and filtered. Accordingly, the optical amplification and filtering equipment may be remotely located from the tapping site, thereby reducing the likelihood of the equipment being uncovered, especially if care is taken to hide the optical fiber.

Although not limited to Wavelength Division Multiplexed (WDM) applications, the use of a tunable bandpass filter may allow to select one optical channel on which to extract data, among a plurality of WDM optical signals.

In some embodiments, a channel checker mode may be configured to tune a center wavelength of the tunable bandpass optical filter to cause a variation thereof, and to collect optical power values measured at an optical power meter as a function of the center wavelength, in order to detect live optical channels. A set mode may further be configured to set a center wavelength of the tunable bandpass optical filter as a function a channel selection of the one optical channel from which to extract data traffic. These functionalities may allow a user to select one optical channel from which to extract data traffic, among the detected wavelength-division multiplexed channels.

The amplified and filtered optical signal can conveniently be input to a commercial optical communication transceiver module such as SFP, SFP+, CFP, XENPAK transceiver modules, to name only few examples, and the electrically-converted data traffic be analyzed by a data analyzer.

In accordance with one aspect, there is provided a system for extracting data traffic from an optical communication fiber carrying at least one optical signal, comprising:

- an optical-fiber clip-on coupler for clamping over the optical communication fiber to extract a portion of the at least one optical signal therefrom, the optical-fiber clip-on coupler having an output optical fiber in which the extracted optical signal is injected
- an optical amplifier having an optical fiber input to receive a portion of the at least one optical signal extracted from the optical communication fiber, to amplify the extracted optical signal;
- a bandpass optical filter to filter the amplified extracted optical signal and having a bandwidth adapted to select one optical channel that carries data traffic and produce optically-carried data traffic; and
- an optical fiber output to output the optically-carried data traffic, whereby the optically-carried data traffic can be carried towards an optical communication transceiver via an optical fiber.

In some embodiments, the system may further comprise an optical communication transceiver to convert the optically-carried data traffic into electrical data traffic for data analysis.

The system may further comprise an optical-fiber clip-on coupler for clamping over the optical communication fiber to extract a portion of the at least one optical signal therefrom, wherein the optical-fiber clip-on coupler may have an output optical fiber in which the extracted optical signal is injected.

In some embodiments, an optical insertion loss introduced along the optical communication fiber by the clip-on device when installed may be less than 1 dB, and preferably less than 0.5 dB.

In some embodiments, a coupling loss of the at least one optical signal towards the output optical fiber of the clip-on device may be greater than 24 dB.

In some embodiments, a length of optical fiber between the optical-fiber clip-on coupler and the optical amplifier may be greater than 0.5 kilometer, and preferably greater than 1 kilometer.

In some embodiments, the system may further comprise:
a variable optical attenuator connected inline between the bandpass optical filter and the optical fiber output;
an optical power meter coupled to an output of said bandpass optical filter; and
a control module configured to control an attenuation value of said variable optical attenuator as a function of an optical power measured at the optical power meter, in order to limit an output power level at the optical fiber output.

In some embodiments, the bandpass optical filter may be tunable and the control module may have a channel checker mode configured to tune a center wavelength of the tunable bandpass optical filter to cause a variation thereof, and to collect optical power values measured at the optical power meter as a function of the center wavelength, in order to detect live wavelength-division multiplexed channels.

In some embodiments, the bandpass optical filter may be bandwidth-adjustable, whereby its bandwidth can be adjusted to optimize a signal-to-noise ratio of the optically-carried data traffic.

In some embodiments, the control module further may have a set mode configured to set a center wavelength of the tunable optical bandpass filter as a function of a channel selection of the one optical channel from which to extract data traffic.

In some embodiments, the system may further comprise a user interface configured to display a list of detected live wavelength-division multiplexed channels and receive from a user said channel selection of the one optical channel from which to extract data traffic among the detected live wavelength-division multiplexed channels.

In accordance with another aspect, there is provided a method for extracting data traffic from an optical communication fiber carrying at least one optical signal, comprising:
extracting a portion of the at least one optical signal from the optical communication fiber using an optical-fiber clip-on coupler clamped over the optical communication fiber, and injecting the extracted optical signal in an optical fiber;
optically amplifying the extracted optical signal using an optical amplifier;
optically filtering the amplified extracted optical signal using a bandpass optical filter to select one optical channel that carries data traffic to produce optically-carried data traffic; and
outputting the optically-carried data traffic on an optical fiber output, whereby the optically-carried data traffic can be carried towards an optical communication transceiver via an optical fiber.

In some embodiments, the method may further comprise converting the optically-carried data traffic into electrical data traffic using said optical communication transceiver for data analysis.

In some embodiments, the extracted optical signal may be propagated over a length greater than 0.5 kilometer, and preferably greater than 1 kilometer, before being amplified by said optical amplifier.

In some embodiments, the method may further comprise controlling an output power level of said optically-carried data traffic at the optical fiber output.

In some embodiments, the method may further comprise, in channel checker mode, detecting live wavelength-division multiplexed channels to generate a list of live wavelength-division multiplexed channels.

In some embodiments, the method may further comprise, in a set mode, setting a center wavelength of the bandpass optical filter as a function a channel selection of the one optical channel from which to extract data traffic.

In some embodiments, the method may further comprise displaying said list of detected live wavelength-division multiplexed channels and receiving from a user said channel selection of the one optical channel from which to extract data traffic, among the detected live wavelength-division multiplexed channels.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application.

Wavelength Division Multiplexing (WDM) is a fiber optical communication technology that multiplexes a plurality of optical signals onto a single optical fiber by using different wavelengths in such a way that different optical signals are transmitted over different respective WDM channels. In the context of the present description, the expression WDM is not limited to a specific WDM wavelength scheme such as Coarse Wavelength Division Multiplexing (DWDM) or Dense Wavelength Division Multiplexing (DWDM).

BRIEF DESCRIPTION OF THE DRAWINGS

Further features and exemplary advantages of the present invention will become apparent to the skilled person from the following detailed description, taken in conjunction with the appended drawings, in which.

It will be noted that throughout the drawings, like features are identified by like reference numerals. To not unduly encumber the figures, some elements may not be indicated in some figures if they were already identified in a preceding figure.

DETAILED DESCRIPTION

It should also be understood that elements of the drawings are not necessarily drawn to scale. Some mechanical or other physical components may also be omitted in order to not encumber the figures.

Fiber-optic communication links are deployed for telecommunication networking in order to support applications such as telephone, text messaging, Internet and data exchange between telecommunication service subscribers. Information is carried over the optical communication fiber in the form of data traffic.

Figure 1:
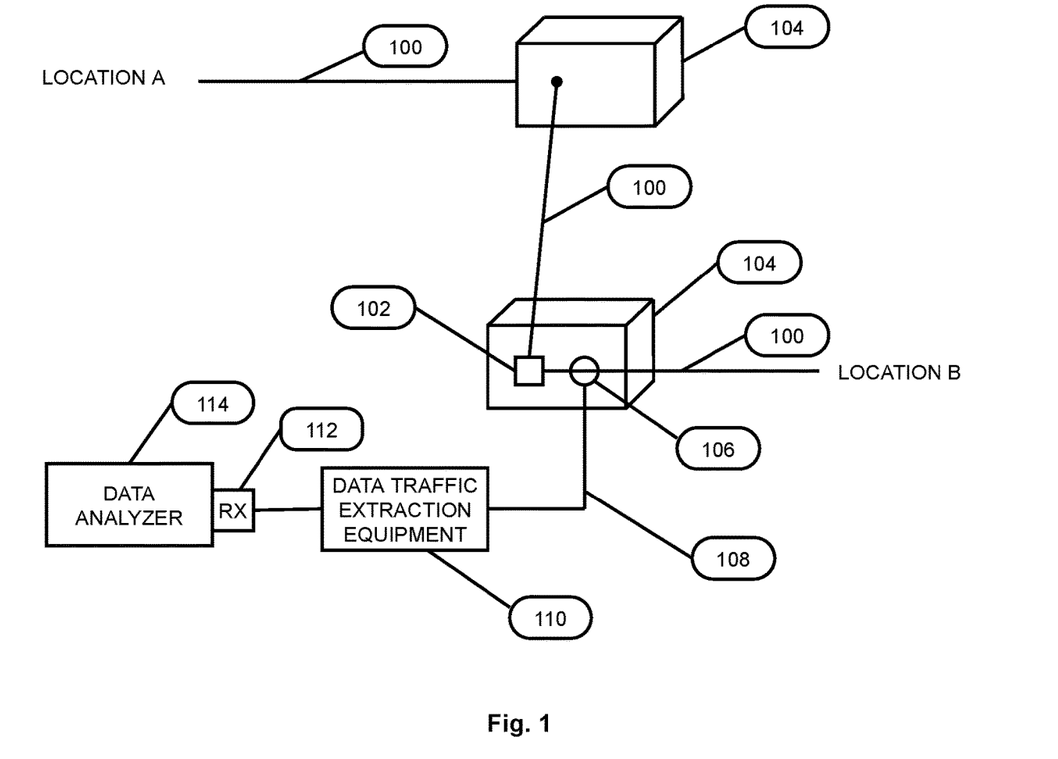
FIG. 1 is a block diagram illustrating an optical communication fiber from which data traffic is to be extracted, in accordance with one embodiment.

Now referring to FIG. 1, when longer fiber connection is made, for example between two cities (illustrated in FIG. 1 as Location A and Location B), optical fibers 100 are often deployed underground. Physically accessing the optical communication fiber is therefore difficult.

With the increasing development of fiber-optic networks, optical fiber joints or termination by splicing is a very common practice nowadays. As optical fibers are sensitive to pulling, bending and crushing forces, network operators using fiber splice trays 102 to provide a safe routing and easy-to-manage environment for the fragile optical fiber splices. These fiber splice trays 102 are deployed in fiber distribution boxes 104, which are disposed over ground so as to provide easy access. This common practice can be used to intercept the optical signals from optical fibers located in the fiber distribution boxes 104.

This can be done by inserting an optical fiber clip-on coupler 106 along optical fibers that are spliced in splicing trays. The optical-fiber clip-on coupler 106 is clamped over an optical communication fiber to extract a portion of the optical signal(s) propagating therein. The extracted portion of optical signal is injected in an output optical fiber 108 by the optical-fiber clip-on coupler 106. It can be carried over a safe distance (such as more than 0.5 or 1 km) before being amplified and filtered. Accordingly, the data traffic extraction equipment 110 may be remotely located from the tapping site, thereby reducing the likelihood of the equipment being uncovered, especially if care is taken to hide the optical fiber.

The optical-fiber clip-on coupler 106 is designed to extract the optical signal while introducing an insertion loss that is not likely to be detected by the network operators of the optical communication fiber. As described herein, an insertion loss as low as 0.5 to 1 dB can be obtained using a clip-on coupler that is based on periodic microbending, while extraction enough optical signal out of the optical communication for the application.

Figure 2:
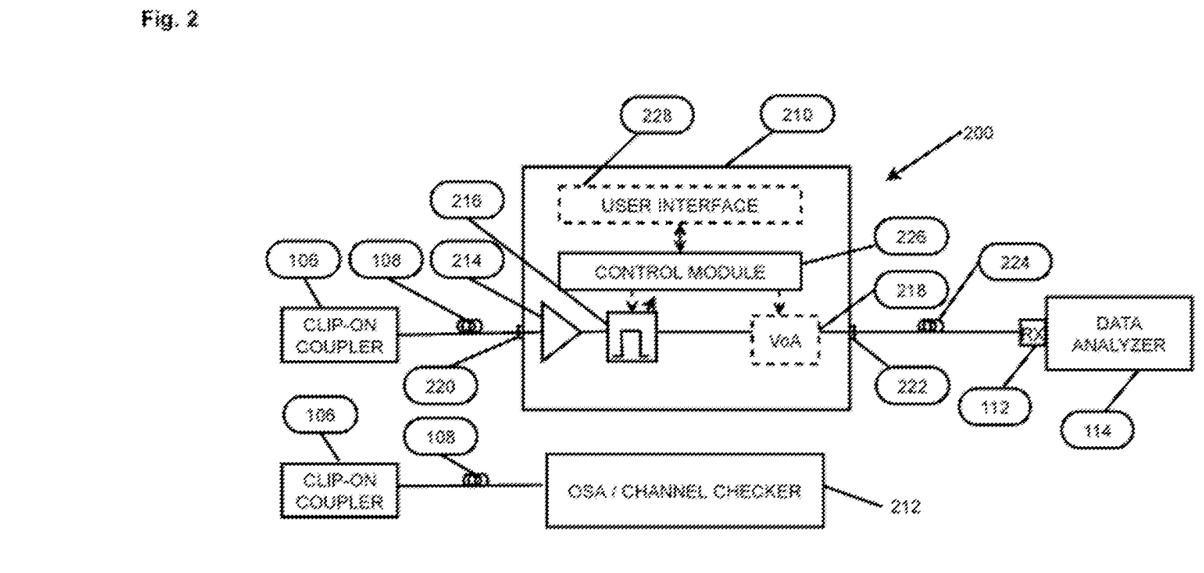
FIG. 2 is a block diagram illustrating a system for extracting data traffic from an optical communication fiber, in accordance with one embodiment wherein separate equipment is used to determine the WDM spectral distribution of the extracted optical signal before data traffic is extracted.
Figure 3:
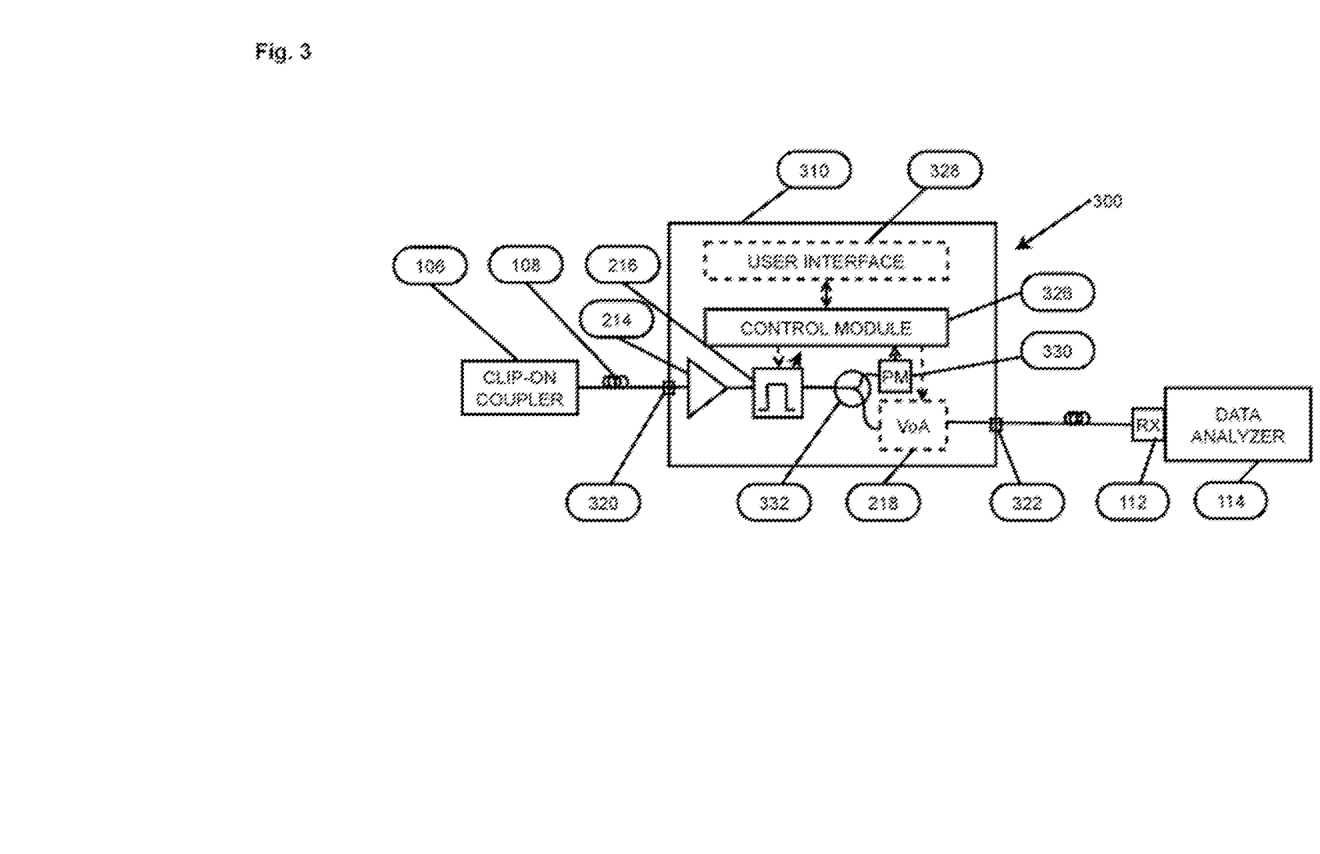
FIG. 3 is a block diagram illustrating a system for extracting data traffic from an optical communication fiber, in accordance with another embodiment wherein an WDM channel analysis function is integrated in the extraction equipment.

The data traffic extraction equipment 110 is used to extract optically-carried data traffic from the extracted optical signal using suitable amplification and filtering as described herein with reference to FIGS. 2 and 3. The optically-carried data traffic can be converted into electrically-carried data traffic using a commercial or custom optical communication transceiver 112, e.g., for telecom data analysis and flow classification by a data analyzer 114. The electrically-carried data traffic may be in the form of communication protocols such as, e.g., Ethernet, FiberChannel, OTN, SONET/SDH, etc. As such, data analyzers originally designed and available in the art for telecom data analysis and flow classifications of data carried over copper or optical communication links (e.g., obtained via optical taps) can be used for monitoring data optically extracted from fiber-optic communication links.

FIG. 2 shows a system 200 for extracting data traffic from an optical communication fiber, in accordance with one embodiment wherein separate equipment is used to determine the WDM spectral distribution of the extracted optical signal before data traffic is extracted.

The optical communication fiber may carry one or more optical signals lying in respective one or more WDM channels. Whenever there is signal power in a given WDM channel, the WDM channel is said to be "live" in that data traffic is presumed to be carried. In the embodiment of FIG. 2, the system 200 is adapted to extract data traffic lying in a selected channel among the live WDM channels.

The system 200 comprises data traffic extraction equipment 210 and, in some embodiments, may further comprise the optical-fiber clip-on coupler 106 and/or the optical communication transceiver 112. It will be understood that the data traffic extraction equipment 210, the optical-fiber clip-on coupler 106 and the optical communication transceiver 112 may be supplied as different parts of the system 200 to be interconnected for operation, and/or be supplied by different manufacturers. For example, one can use an optical communication transceiver 112 that is commercially available from a network equipment provider, in the form of SFP, SFP+, CFP or XENPAK transceiver modules, to name only few examples.

Optionally, the system 200 may further comprise a separate Optical Spectrum Analyzer (OSA) or channel checker 212 used to detect live WDM channels within the extracted optical signal before data traffic is extracted. In one embodiment, an OSA is used to analyze the optical power level of the extracted signal as a function of wavelength to produce an optical spectrum trace which can be analyzed to detect central wavelengths of peaks corresponding to live WDM channels. In another embodiment, a channel checker is used to measure optical power levels within predetermined WDM channels. In any case, the OSA trace and/or a list of detected live WDM channels may be displayed to a user. The user may thus decide upon which WDM channel to monitor based on the displayed information.

Of course, in specific applications, if respective WDM wavelengths of the live optical signals or a given wavelength of one specific optical channel to monitor are/is known a priori, it may not be necessary to detect the live WDM channels with an Optical Spectrum Analyzer (OSA) or channel checker 212.

The extracted optical signal typically represents a small portion of all WDM optical signals propagating along the optical fiber 100 on which the clip-on coupler 106 is installed. In order to minimize the insertion loss introduced by the clip-on coupler 106 on the optical communication fiber (<0.5 or 1 dB for example), the coupling loss of the propagated optical signals to the output optical fiber 108 of the clip-on device 106 is relatively high, i.e. in the range of about 24 to 30 dB, which represents a coupling efficiency of about 0.25%. The portion of optical signal(s) thereby extracted from the optical communication fiber by the optical-fiber clip-on coupler 106 is carried over an optical fiber 108 to an optical fiber input 220. It is noted that propagating the extracted optical signal(s) in a single-mode optical fiber over a distance of about 1 km will introduce an insertion loss of about 0.25 dB, which is negligible when compared to the coupling loss of the clip-on coupler. The extracted optical signal(s) may therefore be safely carried over a length greater than 0.5 or 1 kilometer.

It will be understood that the optical power level of the extracted optical signal(s) should to be amplified before detection. As such, the data traffic extraction equipment 210 comprises an optical amplifier 214, a bandpass optical filter 216 and an optional variable optical attenuator 218. The optical amplifier 214 receives the extracted optical signal(s) at the optical fiber input 220 for amplification. The optical amplifier 214 may comprise an optical fiber amplifier such as, e.g., an Erbium-Doped Fiber Amplifier (EDFA), or a Semiconductor Optical Amplifier (SOA). The bandpass optical filter 216 receives the amplified extracted optical signal, including amplification noise and has a bandpass bandwidth adapted to select one optical channel that carries data traffic. As such, optical signal from any other live WDM channel is filtered out, as well as out-of-band amplification noise. For example, in case of optical signals carried in WDM channels defined by the ITU-T G.694.1 grid, a bandwidth of about 100 GHz may be used. Of course, other bandwidths such as 200 GHz, 50 GHz or 25 GHz may also be envisaged. The bandpass optical filter may be selected to be tunable in order to allow a variable selection of the WDM channel to be monitored. Of course, if the monitored channel is to be fixed, the bandpass optical filter may also be fixed. The bandpass optical filter may further be selected to be adjustable in bandwidth. Such optional feature can be used, e.g., to optimize the signal-to-noise ratio of the output signal and makes the system more adaptable to different modulation rates and formats. Of course, the bandwidth may also be fixed and adapted one or more modulation rates and formats.

The result of the optical amplification and filtering is optically-carried data traffic ready for conversion into electrically-carried data traffic for data analysis. The optically-carried data traffic is output at an optical fiber output 222 in order to be carried towards the optical communication transceiver 112 via an optical fiber 224. The output signal is optically-carried data traffic in the sense that it represents optically modulated data that can be readily detected by a suitable optical communication transceiver. As opposed to the extracted optical signal which may carry multiple WDM channels.

It is noted that to comply with optical power level limits of some optical communication transceivers 112, it may be necessary for some applications to limit the output power level at the optical fiber output 222 using the optional variable optical attenuator 218.

The data traffic extraction equipment 210 may further comprise a control module 226. In case of a tunable bandpass optical filter, the control module may have a set mode configured to set a center wavelength of the tunable optical bandpass filter as a function of a channel selection of the one optical channel to monitor. The control module may further be configured to control an attenuation value of the variable optical attenuator 218 in order to limit an output power level at the optical fiber output 222.

The control module may be embodied by an electronic circuit, a field-programmable gate array (FPGA) circuit, a microprocessor, a central processing unit (CPU), a microcontroller, or the like; and may be implemented in hardware, software, firmware or any combination thereof. It may be integrated, partially integrated or physically separate from the data traffic extraction equipment.

The data traffic extraction equipment 210 may further comprise a user interface 228 configured to receive from a user a channel selection of the one optical channel to monitor. The selection may be entered, for example, in the form of a central wavelength to be applied to the tunable bandpass optical filter 216.

The user interface 228 may take several forms such as the combination of a screen and a keyboard or a mouse, a touchscreen or a smart device including a touchscreen and connected to the data traffic extraction equipment 210.

During use, an operator installs the clip-on coupler 106 over an optical communication fiber from which data traffic is to be extracted. The output optical fiber 108 is deployed up to and connected to the OSA or channel checker 212. It will be understood that the output optical fiber 108 may include one or more connectors or splices therealong but care should generally be taken to minimize the total insertion loss for successful extraction. Center wavelengths of live optical signals may be detected using the OSA or channel checker 212. The output optical fiber 108 is then connected to optical fiber input 220 of the data traffic extraction equipment 210. The user may enter a center wavelength for the bandpass optical filter 216, which is tuned accordingly to select the optical signal from the selected optical channel. The optical fiber output 222 may be connected to the optical communication transceiver 112 and data analyzer 114 so extracted data traffic can be monitored.

FIG. 3 shows a system 300 for extracting data traffic from an optical communication fiber, in accordance with another embodiment wherein a WDM channel analysis function is integrated in the extraction equipment.

The optical communication fiber may carry one or more optical signals lying in respective one or more WDM channels. In the embodiment of FIG. 3, the system 300 is adapted to detect live WDM channels and extract data traffic lying in a selected live channel.

The system 300 has numerous similarities compared to system 200 and, as such, like features will not be repeatedly described.

The system 300 comprises data traffic extraction equipment 310 and, in some embodiments, may further comprise the optical-fiber clip-on coupler 106 and/or the optical communication transceiver 112. As in the system 200, the data traffic extraction equipment 310 comprises an optical amplifier 214, a bandpass optical filter 216 and an optional variable optical attenuator 218. In the system 300, the bandpass optical filter 216 is tunable in order to allow a variable selection of the WDM channel to be monitored. The data traffic extraction equipment 310 further comprises an optical power meter 330 coupled to the output of the bandpass optical filter 216 via, e.g., an optical fiber coupler 332 (also known in the art as a tap coupler). The optical fiber coupler 332 may be a power splitter coupler having an imbalanced coupling ratio such as 10/90, 5/95 or 1/99 for example, wherein the port corresponding to the low coupling ratio is connected to the optical power meter 330 and the other port is connected towards the optical fiber output 322 of the data traffic extraction equipment 310 via the optional variable optical attenuator 218.

The data traffic extraction equipment 310 may further comprise a control module 326. The control module 326 may have a channel checker mode used to detect live WDM channels within the extracted optical signal. As such, the channel checker mode is configured to tune a center wavelength of the tunable bandpass optical filter 216 to cause a variation thereof. In one embodiment, the center wavelength is tuned to discrete and predetermined center wavelength set points. For each center wavelength set point, the channel checker mode collects optical power values measured at the optical power meter 330. By tuning the center wavelength set point so as to correspond to a list of predetermined WDM channels, the collected optical power values may be used to determine a presence of a live signal in each WDM channel of the list. Live WDM channels may thereby be detected. Alternatively, the center wavelength may be tuned in a continuous manner to detect channels having arbitrary center wavelengths. In one embodiment, a list of detected live WDM channels may be displayed to a user and the user may thus decide upon which WDM channel to monitor based on the displayed information.

The control module 326 may further have a set mode configured to set the center wavelength set point of the tunable optical bandpass filter 216 as a function of a channel selection of the one optical channel to monitor, which selection may be entered by a user or automatically set by the control module 326 among the detected live WDM channels.

The control module 326 may further be configured to control an attenuation value of the variable optical attenuator 218 in order to limit an output power level at the optical fiber output 222.

The data traffic extraction equipment 310 may further comprise a user interface 328 configured to receive from a user a channel selection of the one optical channel to monitor. In order to assist the user in making the selection, the list of detected live WDM channels may be displayed, among which the user may make a selection. In one embodiment, the list of detected WDM channels is displayed as a list of predetermined WDM channels each associated with a measured optical power level or a presence status, i.e. live or not. The selection may be entered, for example, in the form of a central wavelength or a channel number.

In embodiments wherein the bandpass optical filter 216 is bandwidth adjustable, a bandwidth setting may be entered by a user. As such, the user interface 328 may be configured to receive from a user the bandwidth setting to be applied to the bandpass optical filter 216. In other embodiments, the bandwidth may be automatically set by the control module 326 based, e.g., on the power level value measured by the optical power meter 330.

During use, an operator installs the clip-on coupler 106 over an optical communication fiber from which data traffic is to be extracted. The output optical fiber 108 is deployed up to and connected to data traffic extraction equipment 310. In the channel checker mode, live WDM channels are detected and a list may be displayed. The user may input a channel selection and, in the set mode, the center wavelength of the bandpass optical filter 216 is tuned to select the optical signal from the selected WDM channel. The optical fiber output 222 may be connected to the optical communication transceiver 112 and data analyzer 114 so extracted data traffic can be monitored.

The systems of FIGS. 2 and 3 are adapted to extract data traffic lying in a selected channel among the live WDM channels, one channel at a time. However, in other embodiments, it could be envisaged to replicate part of the system in order monitor multiple WDM channels simultaneously. In yet other embodiments, a bandpass optical filter could be implemented as a WDM demultiplexer combined with an optical switch to select which demultiplexed WDM channel to output. A Wavelength Selective Switch (WSS) could also be employed similarly.

Figure 4:
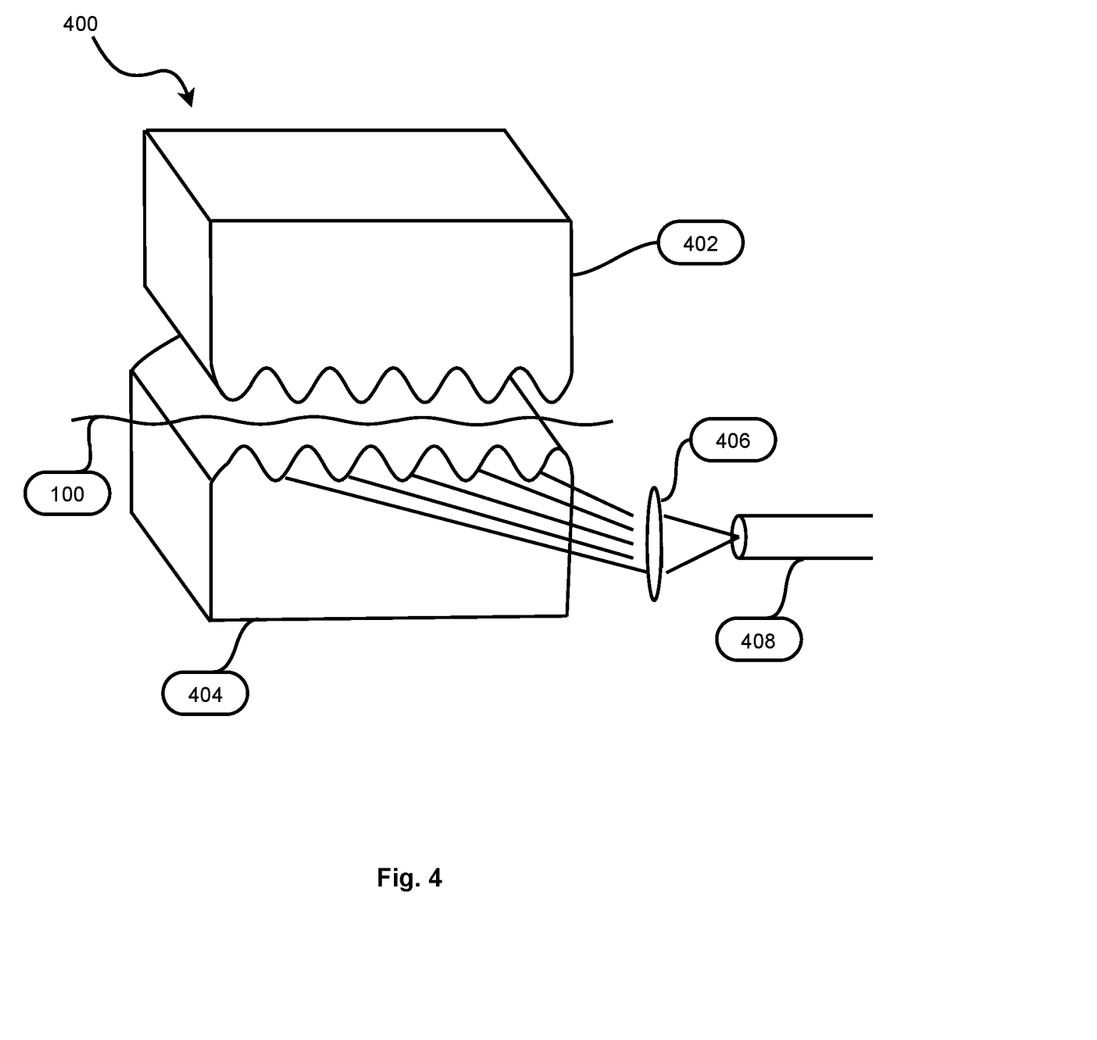
FIG. 4 is a schematic illustrating an optical-fiber clip-on coupler in accordance with one embodiment.

FIG. 4 is a schematic illustrating an optical-fiber clip-on coupler 400 in accordance with one embodiment. It is noted that the clip-on coupler 400 is shown herein for illustrative purpose only and the systems 200 or 300 are not restricted to this specific implementation and that other coupler devices based, e.g. on macro bending, could also be envisaged. However, periodic micro bending has the advantage over macro bending of inducing a light extraction that is more directional, which allows higher coupling efficiency of the extracted light to the output optical fiber 108. The clip-on coupler 400 is designed for installation over an unjacketed segment of optical fiber. As such, it can be installed over an unjacketed section already present in a splicing tray for example, or the jacket can be removed on a short segment before installation. An unjacketed segment of about 3 centimeters is enough for installing the clip-on coupler 400.

The clip-on coupler 400 comprises a pair of opposing clamping jaws 402, 404. The opposing surfaces of the jaws 402, 404 have complementary textures that, when the jaws are pushed towards one another over an optical fiber, induce a periodic micro bending therein. In one embodiment, the opposing surfaces of the jaws 402, 404 comprise periodic grooves and ridges transversally disposed relative to the optical fiber, wherein ridges of one jaw 402 are aligned with grooves of the other jaw 404 and vice versa. The induced periodic micro bends cause a small portion of light propagating in the optical fiber to escape the optical fiber. At least one of the jaws 402 is made of a material that is substantially transparent to the optical signal(s) to be extracted from the optical fiber, sufficiently transparent for part of the escaped light to reach a collimating lens 406 that is placed close to the jaw 402. The collimating lens 406 collects that light and injects in an output optical fiber 408. A portion of light propagating in the clamped optical fiber is thereby extracted and injected in the output optical fiber 408. With a proper design of the micro bends, the extraction can be made sufficiently directional to allow collection by the collimating lens 406 and injection in the output optical fiber 408 with an acceptable coupling efficiency. Applying the right level of pressure with the jaws 402, 404, allows to obtain an insertion loss that remains below 1 dB or even below 0.5, along with a coupling loss of about 24 to 30 dB.

Various changes, modifications, and equivalents of the methods, apparatuses and/or systems described herein will suggest themselves to those of ordinary skill in the art. Although some features may be described with respect to individual exemplary embodiments, aspects need not be limited thereto such that features from one or more exemplary embodiment may be combinable with other features from one or more exemplary embodiments. Description of well-known functions and structures are omitted to enhance clarity and conciseness.

The embodiments described above are intended to be exemplary only. The scope of the invention is therefore intended to be limited solely by the appended claims.

The invention claimed is:

1. A system for extracting data traffic from an optical communication fiber carrying at least one optical signal, the system comprising:

an optical-fiber clip-on coupler configured for clamping over the optical communication fiber to extract a portion of the at least one optical signal therefrom, the optical-fiber clip-on coupler having an output optical fiber in which the extracted optical signal is injected, wherein the optical-fiber clip-on coupler is configured to induce a periodic micro bending of the optical communication fiber in order to extract said portion of the at least one optical signal therefrom and couple extracted light to the output optical fiber, wherein an optical insertion loss introduced along the optical communication fiber by the clip-on coupler when installed is less than 1 db, and wherein a coupling loss of the at least one optical signal towards the output optical fiber of the clip-on coupler is less than 30 db;

an optical amplifier having an optical fiber input to receive said portion of the at least one optical signal when extracted from the optical communication fiber, to amplify the extracted optical signal;
a bandpass optical filter to filter the amplified extracted optical signal and having a bandwidth adapted to select one optical channel that carries data traffic and produce optically-carried data traffic; and
an optical fiber output to output the optically-carried data traffic for the optically-carried data traffic to be carried towards an optical communication transceiver via an optical fiber.

2. The system as claimed in claim 1, wherein:
the optical communication transceiver is configured to convert the optically-carried data traffic into electrically-carried data traffic for data analysis.

3. The system as claimed in claim 1, wherein the coupling loss of the at least one optical signal towards the output optical fiber of the clip-on coupler is greater than 24 dB.

4. The system as claimed in claim 3, wherein a length of optical fiber between the optical-fiber clip-on coupler and the optical amplifier is greater than 0.5 kilometer.

5. The system as claimed in claim 4, comprising:
a variable optical attenuator connected inline between the bandpass optical filter and the optical fiber output;
an optical power meter coupled to an output of said bandpass optical filter; and
a control module configured to control an attenuation value of said variable optical attenuator as a function of an optical power measured at the optical power meter, in order to limit an output power level at the optical fiber output.

6. The system as claimed in claim 5, wherein the bandpass optical filter is tunable and wherein the control module has a channel checker mode configured to tune a center wavelength of the tunable bandpass optical filter to cause a variation thereof, and to collect optical power values measured at the optical power meter as a function of the center wavelength, in order to detect live wavelength-division multiplexed channels.

7. The system as claimed in claim 6, wherein said bandpass optical filter is bandwidth-adjustable to optimize a signal-to-noise ratio of the optically-carried data traffic.

8. The system as claimed in claim 1, wherein a length of optical fiber between the optical-fiber clip-on coupler and the optical amplifier is greater than 0.5 kilometer.

9. The system as claimed in claim 1, configured whereby an optical insertion loss introduced along the optical communication fiber by the clip-on coupler when installed is less than 0.5 dB.

10. The system as claimed in claim 1, wherein a length of optical fiber between the optical-fiber clip-on coupler and the optical amplifier is greater than 1 kilometer.

11. The system as claimed in claim 1, comprising:
a variable optical attenuator connected inline between the bandpass optical filter and the optical fiber output;
an optical power meter coupled to an output of said bandpass optical filter; and
a control module configured to control an attenuation value of said variable optical attenuator as a function of an optical power measured at the optical power meter, in order to limit an output power level at the optical fiber output.

12. A method for extracting data traffic from an optical communication fiber carrying at least one optical signal, the method comprising:
extracting a portion of the at least one optical signal from the optical communication fiber using an optical-fiber clip-on coupler clamped over the optical communication fiber, and injecting the extracted optical signal in an output optical fiber, wherein the optical-fiber clip-on coupler induces a periodic micro bending of the optical communication fiber in order to extract said portion of the at least one optical signal therefrom and couple the extracted light to the output optical fiber, wherein an optical insertion loss introduced along the optical communication fiber by the clip-on coupler when installed is less than 1 db, and wherein a coupling loss of the at least one optical signal towards the output optical fiber of the clip-on coupler is less than 30 db;
optically amplifying the extracted optical signal using an optical amplifier;
optically filtering the amplified extracted optical signal using a bandpass optical filter to select one optical channel that carries data traffic to produce optically-carried data traffic; and
outputting the optically-carried data traffic on an optical fiber output for the optically-carried data traffic to be carried towards an optical communication transceiver via an optical fiber.

13. The method as claimed in claim 12, comprising:
converting the optically-carried data traffic into electrical data traffic using said optical communication transceiver for data analysis.

14. The method as claimed in claim 13, comprising:
controlling an output power level of said optically-carried data traffic at the optical fiber output.

15. The method as claimed in claim 14, comprising, in a channel checker mode:
detecting live wavelength-division multiplexed channels to generate a list of live wavelength-division multiplexed channels.

16. The method as claimed in claim 15, comprising, in a set mode:
setting a center wavelength of the bandpass optical filter as a function of a channel selection of the one optical channel from which to extract data traffic.

17. The method as claimed in claim 16, comprising:
displaying said list of detected live wavelength-division multiplexed channels and receiving from a user said channel selection of the one optical channel from which to extract data traffic, among the detected live wavelength-division multiplexed channels.

18. The method as claimed in claim 12, comprising:
controlling an output power level of said optically-carried data traffic at the optical fiber output.

\* \* \* \* \*